United States Patent
Kim et al.

(10) Patent No.: US 11,840,118 B2
(45) Date of Patent: Dec. 12, 2023

(54) VEHICLE AND CONTROL METHOD THEREOF

(71) Applicants: HYUNDAI MOTOR COMPANY, Seoul (KR); KIA CORPORATION, Seoul (KR)

(72) Inventors: Dae Hwan Kim, Suwon-si (KR); Sam Yong Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 49 days.

(21) Appl. No.: 17/546,442

(22) Filed: Dec. 9, 2021

(65) Prior Publication Data

US 2022/0194158 A1   Jun. 23, 2022

(30) Foreign Application Priority Data

Dec. 23, 2020 (KR) .................. 10-2020-0182230

(51) Int. Cl.
*B60G 17/0165* (2006.01)
*B60Q 9/00* (2006.01)
*B60G 17/019* (2006.01)
*G06V 20/58* (2022.01)
*G06T 7/60* (2017.01)

(52) U.S. Cl.
CPC ....... *B60G 17/0165* (2013.01); *B60G 17/019* (2013.01); *B60Q 9/008* (2013.01); *G06T 7/60* (2013.01); *G06V 20/58* (2022.01); *B60G 2400/204* (2013.01); *B60G 2400/252* (2013.01); *B60G 2400/823* (2013.01); *B60G 2401/14* (2013.01); *B60G 2500/30* (2013.01); *G06T 2207/30261* (2013.01)

(58) Field of Classification Search
CPC .............. B60G 17/0165; B60G 17/019; B60G 2400/204; B60G 2400/252; B60G 2400/823; B60G 2401/14; B60G 2500/30; G06V 20/58; B60Q 9/008; G06T 7/60; G06T 2207/30261
See application file for complete search history.

(56) References Cited

U.S. PATENT DOCUMENTS

| | | | | |
|---|---|---|---|---|
| 5,530,420 A | * | 6/1996 | Tsuchiya ................ | G06T 7/593 348/42 |
| 8,218,008 B2 | * | 7/2012 | Wu .......................... | G09G 5/00 382/104 |
| 9,834,141 B2 | * | 12/2017 | Tan .......................... | B60R 1/00 |

(Continued)

*Primary Examiner* — Toan C To
(74) *Attorney, Agent, or Firm* — Morgan Lewis & Bockius LLP

(57) ABSTRACT

A vehicle includes an alarm portion, a storage configured to store information on a ground clearance, a camera configured to obtain a surrounding image including a front image and a rear image of the vehicle, and a controller configured to, when an object in front of the vehicle is recognized based on the front image obtained by the camera, determine a height of the object based on the front image obtained by the camera, and when the ground clearance is greater than the height of the object by comparing the height of the object with the ground clearance, and when the object is not recognized in a rear side of the vehicle based on the rear image obtained by the camera, configured to control the alarm portion to output a warning alarm.

14 Claims, 7 Drawing Sheets

(56) References Cited

U.S. PATENT DOCUMENTS

| | | | |
|---|---|---|---|
| 2009/0122140 A1* | 5/2009 | Imamura | G06T 7/74 |
| | | | 348/148 |
| 2010/0238051 A1* | 9/2010 | Suzuki | G06T 15/205 |
| | | | 340/932.2 |
| 2012/0069182 A1* | 3/2012 | Sumi | H04N 7/181 |
| | | | 348/148 |
| 2013/0093583 A1* | 4/2013 | Shapiro | B60Q 9/005 |
| | | | 348/148 |
| 2016/0119587 A1* | 4/2016 | Tan | H04N 7/181 |
| | | | 348/148 |
| 2017/0349023 A1* | 12/2017 | Mori | B60G 17/0195 |
| 2018/0118204 A1* | 5/2018 | Ito | G06F 18/256 |

\* cited by examiner

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2020-0182230, filed on Dec. 23, 2020, in the Korean Intellectual Property Office, the disclosure of which is incorporated by reference herein in its entirety

TECHNICAL FIELD

The disclosure relates to a vehicle capable of determining whether an object is caught in a lower portion of the vehicle and a control method thereof.

BACKGROUND

Recently, as the vehicle traffic increases, accidents also occur frequently. In particular, when there is an object on the road, the driver may drive over the object without recognizing the object, which may cause the accidents frequently. An object that falls on the road may get caught on a lower portion of the vehicle and cause damage to the vehicle or cause a fire due to friction with the lower portion of the vehicle. In preparation for this, research on a technology for determining whether an object that falls on the road is caught in the lower portion has been actively carried out.

In this regard, a technology for recognizing an object using a device such as a camera, radar, and lidar and for determining whether the recognized object is caught in the lower portion of the vehicle has been actively studied.

In addition, recently, as cameras are mounted not only on the front, but also on the lateral side and rear side, the surrounding images of the vehicle may be obtained and thus a technology using the images has been carried out.

SUMMARY

Therefore, it is an aspect of the disclosure to provide a vehicle capable of, when an object is not detected within a predetermined time after being located under the vehicle, determining that the object is caught and capable of providing an alarm, and a control method thereof.

Additional aspects of the disclosure will be set forth in part in the description which follows and, in part, will be obvious from the description, or may be learned by practice of the disclosure.

In accordance with an aspect of the disclosure, a vehicle includes an alarm portion, a storage configured to store information on a ground clearance, a camera configured to obtain a surrounding image including a front image and a rear image of the vehicle, and a controller configured to, when an object in front of the vehicle is recognized based on the front image obtained by the camera, determine a height of the object based on the front image obtained by the camera, and when the ground clearance is greater than the height of the object by comparing the height of the object with the ground clearance, and when the object is not recognized in a rear side of the vehicle based on the rear image obtained by the camera, configured to control the alarm portion to provide a warning alarm to a user.

The vehicle may further include a driving portion, and when the height of the object is greater than the ground clearance by comparing the height of the object with the ground clearance, the controller may be configured to control the driving portion to increase the ground clearance.

The vehicle may further include a sensor configured to obtain driving information including speed information of the vehicle, and the controller may be configured to obtain location information of the object based on the front image obtained by the camera, configured to determine a predicted driving route based on the driving information, and configured to compare the height of the object with the ground clearance, when it is determined that the object is located on the predicted driving route of the vehicle based on the predicted driving route and the location information of the object.

The controller may be, when it is determined that the object is located under the vehicle based on the driving information of the vehicle and the location information of the object, configured to calculate an escape time that is a period from a point of time when the object is located under the vehicle to a point of time of recognizing the object based on the rear image obtained by the camera, and when the object is not recognized within the escape time, configured to control the alarm portion to output the warning alarm.

The camera may be configured to obtain a side image of the vehicle, and the controller may be, when it is determined that the object is located under the vehicle based on the driving information of the vehicle and the location information of the object, configured to calculate an escape time that is a time taken from a point of time when the object is located under the vehicle to a point of time of recognizing the object based on the side image obtained by the camera, and when the object is not recognized within the escape time, configured to control the alarm portion to output the warning alarm.

When the object is not recognized within the escape time based on the rear image obtained by the camera, the controller may be configured to control the alarm portion to output a guide alarm that recommends moving the vehicle to a predetermined conditioned place.

When the object is not recognized within the escape time based on the rear image obtained by the camera, the controller may be configured to control a driving portion to move the vehicle to the predetermined conditioned place.

The vehicle may further include a gear knob, and when it is determined that the vehicle is being parked based on a gear value input through the gear knob, and when the ground clearance is less than the height of the object by comparing the height of the object with the ground clearance, and when it is determined that the object is located on the predicted driving route, the controller may be configured to control the alarm portion to output a warning alarm.

In accordance with another aspect of the disclosure, a control method of a vehicle includes, when an object in front of the vehicle is recognized based on a front image obtained by a camera, determining a height of the object based on the front image obtained by the camera, and when a ground clearance is greater than the height of the object by comparing the height of the object with the ground clearance, and when the object is not recognized in a rear side of the vehicle based on a rear image obtained by the camera, controlling an alarm portion to output a warning alarm.

The control method of the vehicle may further include, when the height of the object is greater than the ground clearance by comparing the height of the object with the ground clearance, controlling a driving portion to increase the ground clearance.

The comparison of the height of the object with the ground clearance may include obtaining location information of the object based on the front image obtained by the camera, determining a predicted driving route based on driving information including speed information of the vehicle, and comparing the height of the object with the ground clearance, when it is determined that the object is located on the predicted driving route of the vehicle based on the predicted driving route and the location information of the object.

The outputting of the warning alarm may include, when it is determined that the object is located under the vehicle based on the driving information of the vehicle and the location information of the object, calculating an escape time that is a period from a point of time when the object is located under the vehicle to a point of time of recognizing the object based on the rear image obtained by the camera, and when the object is not recognized within the escape time, outputting the warning alarm.

The outputting of the warning alarm may include, when it is determined that the object is located under the vehicle based on the driving information of the vehicle and the location information of the object, calculating an escape time that is a time taken from a point of time when the object is located under the vehicle to a point of time of recognizing the object based on a side image obtained by the camera, and when the object is not recognized within the escape time, outputting the warning alarm.

The outputting of the warning alarm may include, when the object is not recognized within the escape time based on the rear image obtained by the camera, outputting a guide alarm that recommends moving the vehicle to a predetermined conditioned place.

The control method of the vehicle may further include, when the object is not recognized within the escape time based on the rear image obtained by the camera, controlling a driving portion to move the vehicle to the predetermined conditioned place.

The outputting of the warning alarm may include, when it is determined that the vehicle is being parked based on a gear value input through a gear knob, and when the ground clearance is less than the height of the object by comparing the height of the object with the ground clearance, and when it is determined that the object is located on the predicted driving route, outputting the warning alarm.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
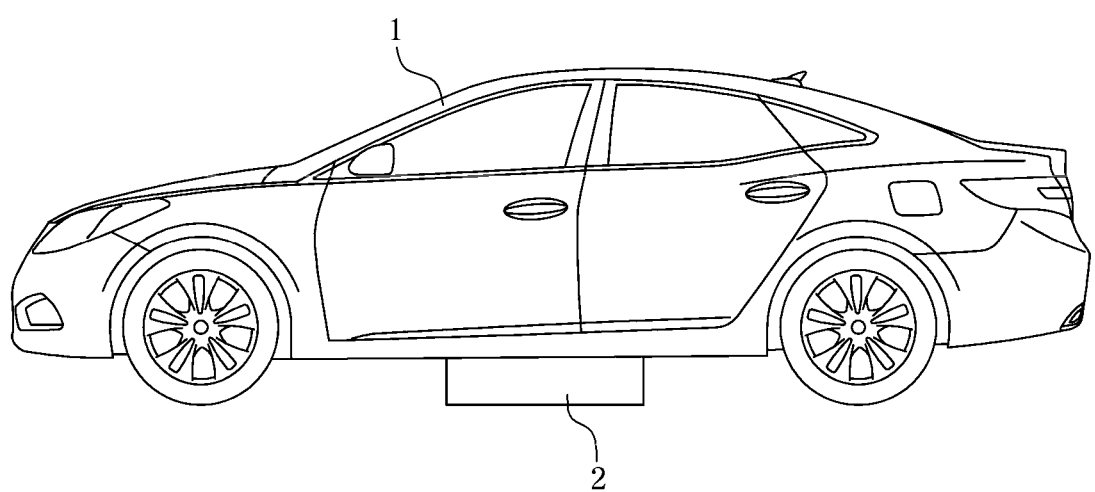
FIG. 1 is a view illustrating an example in which an object is caught in a lower portion of a vehicle according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

Figure 2:
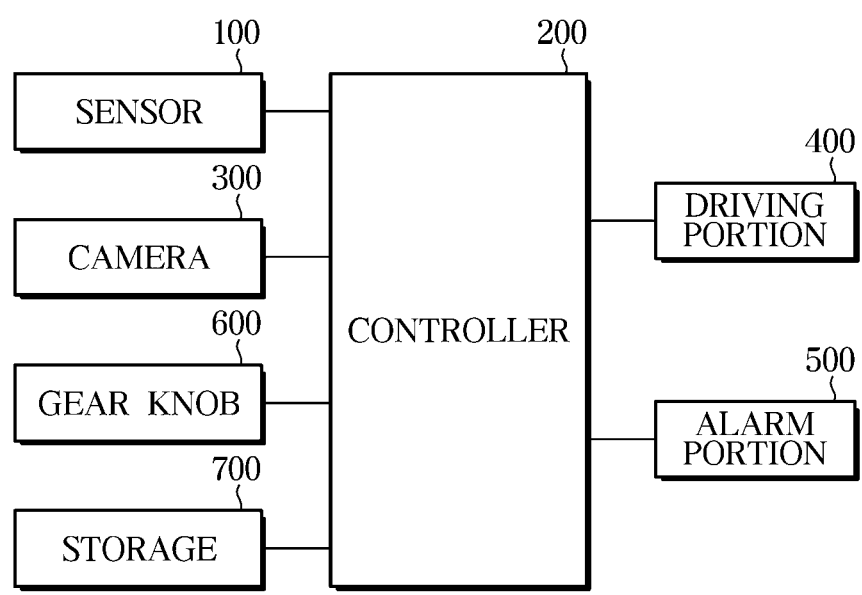
FIG. 2 is a control block diagram illustrating the vehicle according to an embodiment of the disclosure.
Figure 3:
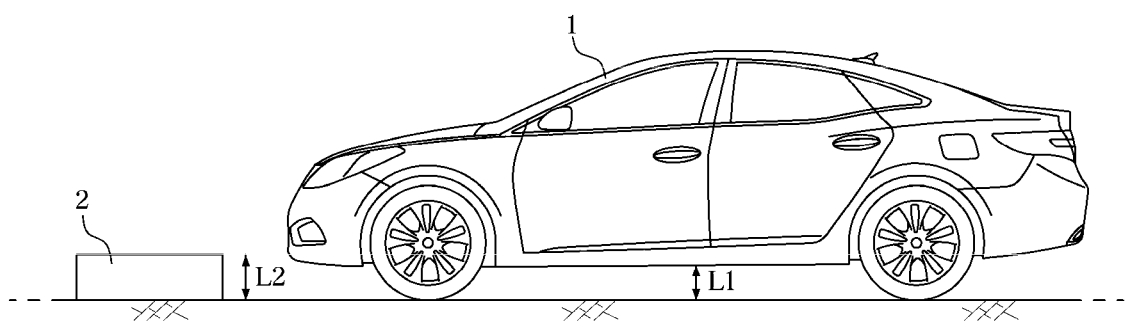
FIG. 3 is a view illustrating an operation of comparing a height of an object with a ground appearance according to an embodiment of the disclosure.

FIG. 1 is a view illustrating an example in which an object is caught in a lower portion of a vehicle according to an embodiment of the disclosure. FIG. 2 is a control block diagram illustrating the vehicle according to an embodiment of the disclosure. FIG. 3 is a view illustrating an operation of comparing a height of an object with a ground clearance according to an embodiment of the disclosure. The present disclosure may determine whether an object, which falls from a vehicle to a road, is caught in a lower portion of the vehicle in order to prevent the vehicle from being damaged caused by the object caught in the lower portion of the vehicle and to prevent a fire due to friction between the object and the lower portion of the vehicle, and accordingly, the present disclosure may protect a driver and prevent a vehicle damage.

Referring to FIGS. 1 to 3, a vehicle 1 may include an alarm portion 500, a storage 700 configured to store information about a ground clearance L1, a camera 300 configured to obtain a surrounding image including a front image and a rear image of the vehicle, and a controller 200 configured to, when an object 2 in front of the vehicle 1 is recognized based on a front image obtained by the camera 300, determine a height L2 of the object 2 based on the front image obtained by the camera 300, and when the ground clearance L1 is greater than the height L2 of the object 2 by comparing the ground clearance L1 with the height L2 of the object 2, and when the object 2 is not recognized in a rear side of the vehicle based on a rear image obtained by the camera 300 after recognizing the object 2 in front of the vehicle 1, configured to control the alarm portion 500 to provide a warning alarm to a user. Further, the vehicle 1 may include a driving portion 400 and a gear knob 600. The alarm portion 500 may include a display, and a buzzer sound outputting device such as a speaker. The display may include a HEAD UP DISPLAY (HUD), and an AUDIO VIDEO NAVIGATION (AVN) cluster, and may also provide a haptic warning. In addition, the alarm portion 500 may mean a device required to provide a warning alarm to a user. Further, when it is determined that an object is caught in the lower portion of the vehicle, a human machine interface (HIM) may inform a user of the accident. The storage 700 may store information on the ground clearance L1. "Ground clearance" represents a height of a lower portion of a vehicle body and the ground clearance L1 may represent a height required to predict whether the object 2 is caught in the lower portion of the vehicle body.

The storage 700 may be implemented as at least one of a non-volatile memory device, such as a cache, a read only memory (ROM), a programmable ROM (PROM), an erasable programmable ROM (EPROM), an electrically erasable programmable ROM (EEPROM), and a flash memory, or a volatile memory device, such as a random access memory (RAM), or a storage medium, such as a hard disk drive (HDD) and CD-ROM, but is not limited thereto. The storage 700 may be a memory implemented as a chip separate from a processor described below with respect to the controller 200, or may be implemented as a single chip with the processor.

The vehicle may include a sensor 100. The sensor may include a vehicle sensor, such as a steering sensor, a wheel pulse/Inertial Measurement Unit (IMU) and a gyro sensor, and may obtain vehicle dynamics information. By the sensor, it is possible to calculate a longitudinal velocity, a longitudinal acceleration, a lateral velocity, a lateral acceleration, a steering angle, a yaw rate of the vehicle. By the sensor, it is possible to determine a case in which a tire slip occurs due to an ice plate under the vehicle or a case in which a driver steers a lot.

The camera 300 may obtain a surrounding image including a front image and a rear image of the vehicle 1. The camera 300 may include a plurality of cameras 300, and may represent a Surround View Monitor (SVM) camera 300. The camera 300 may obtain not only the front and rear images, but also the side images, which are images of the left side and the right side. The controller 200 may recognize the object 2 in front of the vehicle 1 based on the front image obtained by the camera 300. Recognizing a thing as the object 2 may represent that a thing is recognized as the object 2 based on a predetermined reference. Particularly, recognizing a thing as the object 2 may represent that a thing is recognized as the object 2 based on an image corresponding to the object 2 in the front of the vehicle 1 based on the obtained front image. Thereafter, the controller may determine the height L2 of the object 2 based on the front image obtained by the camera 300. The height L2 of the object 2 may mean a height from the ground to the uppermost end of the object 2. This is to determine whether the object 2 is caught in the lower body of the vehicle 1 as the object 2 passes through under the lower body of the vehicle. The controller 200 may compare the height L2 of the object 2 with the ground clearance L1, and when the height L2 of the object 2 is greater than the ground clearance L1, the controller 200 may control the driving portion 400 to increase the ground clearance L1. Increasing the ground clearance L1 may mean increasing the height in accordance with the height L2 of the object 2. The driving portion 400 may adjust devices including a suspension or an actuator, and control an overall operation of the vehicle 1. When the height L2 of the object 2 is greater than the ground clearance L1, the driving portion 400 may control the suspension to increase the height of the lower body of the vehicle 1. When the ground clearance L1 is greater than the height L2 of the object 2, and when the object 2 is not recognized in a rear side of the vehicle 1 based on the rear image obtained by the camera 300 after recognizing the object 2 in front of the vehicle 1, the controller 200 may control the alarm portion 500 to provide a warning alarm to a user. An operation of recognizing the object 2 in the rear side will be described in detail later.

The controller may be implemented as a memory configured to store an algorithm for controlling the operation of components in the vehicle or data for a program that reproduces the algorithm, and a processor configured to perform the above-described operation when executing the algorithm stored in the memory. In this case, the memory and the processor may be implemented as separate chips. Alternatively, the memory and the processor may be implemented as a single chip.

Figure 4:
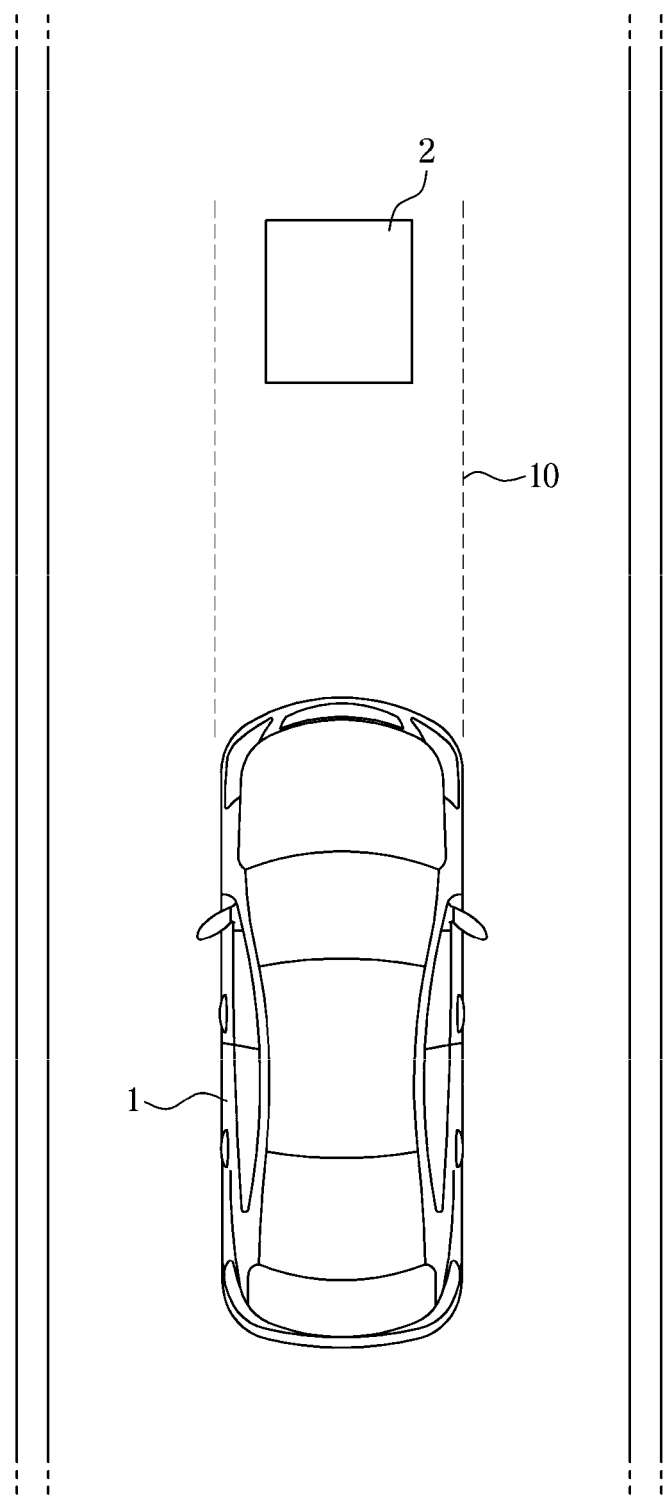
FIG. 4 is a view illustrating a case in which an object is located on a driving route of the vehicle according to an embodiment of the disclosure.
Figure 5:
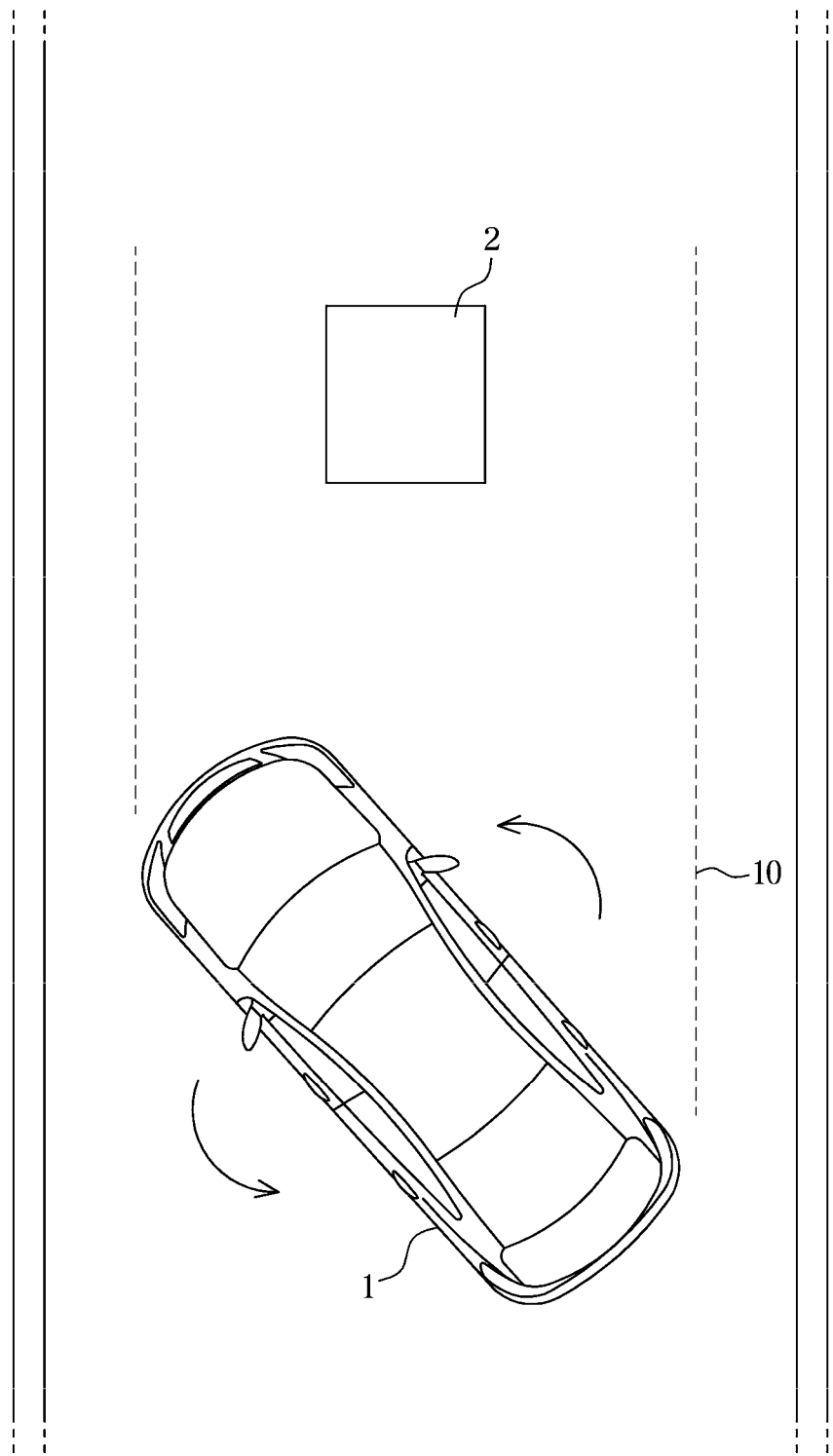
FIG. 5 is a view illustrating an operation of predicting a direction to which an object enters under a vehicle body and a direction from which the object escapes from under the vehicle body based on speed information of the vehicle according to an embodiment of the disclosure.

FIG. 4 is a view illustrating a case in which the object 2 is located on a driving route 10 of the vehicle 1 according to an embodiment of the disclosure. FIG. 5 is a view illustrating an operation of predicting a direction to which the object 2 enters under the vehicle body and a direction from which the object 2 exits from under the vehicle body based on speed information of the vehicle according to an embodiment of the disclosure. Referring to FIGS. 4 and 5, the vehicle 1 may further include a sensor configured to obtain driving information including speed information of the vehicle 1. The speed information of the vehicle 1 may include a speed of the vehicle 1 and a driving direction of the vehicle 1. The driving information may include the speed information of the vehicle 1 and a heading direction of the vehicle 1. The controller may obtain location information of the object 2 based on the front image obtained by the camera. The location information of the object 2 may mean a relative position of the object 2 with respect to the vehicle 1. The controller may determine a predicted driving path 10 of the vehicle 1 based on the driving information. Because the driving information includes the speed information of the vehicle 1 and the heading direction information of the vehicle 1, the controller may predict a direction to which the vehicle 1 will move, which may represent a predicted range in which the vehicle is drivable. For example, if the vehicle 1 is in a first lane, it may not be necessary to consider an object 2 in a fourth lane not too far in front, and thus in this case, it is possible to include considering an object 2 in first and second lanes. The predicted driving path 10 may represent a range in which the vehicle 1 is drivable to define the object 2 that is considered, as mentioned above, and the range may be set in various manners. The controller may compare the height of the object 2 with the ground clearance when it is determined that the object 2 is located on the predicted driving path 10 of the vehicle 1 based on the predicted driving path 10 and the location information of the object 2. According to situations, the operation of comparing the height of the object 2 with the ground clearance may be set to have a higher priority than the operation of determining whether the object 2 is located on the predicted driving path 10 of the vehicle 1. When it is determined that the object 2 is located under the vehicle 1 based on the driving information and the location information of the object 2, the controller may calculate an escape time that is a period from a point of time of determining that the object 2 is located under the vehicle 1 to a point of time of recognizing the object 2 based on the rear image obtained by the camera, and when the object 2 is not recognized within the escape time, the controller may control the alarm portion to provide the warning alarm to the user. Further, when it is determined that the object 2 is located under the vehicle 1 based on the driving information and the location information of the object 2, the controller may calculate an escape time that is a time taken from a point of time of determining that the object 2 is located under the vehicle 1 to a point of time of recognizing the object 2 based on the side image obtained by the camera, and when the object 2 is not recognized within the escape time, the controller may control the alarm portion to provide the warning alarm to the user. That the object 2 is located under the vehicle 1 may be based on the location information of the object 2 and the driving information of the vehicle 1. For example, the controller may predict that the object 2 will enter under the vehicle 1 by considering that the object 2 is currently 1 m in front of the vehicle 1 and by considering the speed and direction of the vehicle 1. Further, when the object 2 appears and then disappears on the image of the front camera, the controller may identify that the object 2 is located under the vehicle 1 by considering the speed and direction of the vehicle 1. In this case, the controller may calculate an escape time that is a period from a point of time of determining that the object 2 is located under the vehicle 1 to a point of time of recognizing the object 2 based on the rear image or the side image obtained by the camera. For example, if it is assumed that the vehicle 1 drives in a straight line along a road lane, the object 2 may enter the front direction of the vehicle 1 and exit from the rear of the vehicle 1. In this case, a time until the object 2 exits from the rear of the vehicle 1 in consideration of the speed of the vehicle 1 may be calculated as the escape time. In addition, when the vehicle 1 slides due to a slip phenomenon or the like, the object 2 may enter the lateral side rather than the front of the vehicle 1. According to the driving direction of the vehicle 1, the object 2 may exit from the lateral side rather than the rear side of the vehicle 1. That is, the entry and exit directions of the object 2 may vary according to the direction of the vehicle 1, and thus the entry direction is not limited to the front side and the exit direction is not limited to the rear side, although the descriptions above are based on an example in which the entry direction is towards the front side of the vehicle 1 and the exit direction is away from the rear side of the vehicle 1. According to the driving direction or rotational direction of the vehicle 1, the object 2 may enter the front side, the lateral side or the rear side of the vehicle 1, and may exit from the front side, the lateral side or the rear side of the vehicle 1. When the object 2 is not recognized on the rear image or the side image within the escape time, which is the time it takes for the object 2 to exit, the controller may determine that the object 2 is caught in the lower portion of the vehicle 1. Further, the controller may determine whether the object 2 is caught in the lower portion of the vehicle 1 in consideration of a length and width of the vehicle 1. In this case, the escape time may be determined according to the speed of the vehicle 1 or may be preset. Further, the escape time may be determined in consideration of the size of the vehicle 1. When it is determined that the object 2 is caught in the lower portion of the vehicle 1, the controller may provide a warning alarm to the user through the alarm portion. The controller may also provide a user with a guide alarm that recommends moving the vehicle 1 to a place under a predetermined condition. The predetermined conditioned place may mean a place where the user can safely remove the object 2 caught in the vehicle 1, and this condition may be preset. The guide alarm may mean an alarm that recommends movement to the predetermined conditioned place. In addition, when it is determined that the object 2 is caught in the lower portion of the vehicle 1, the controller may control the driving portion to directly move to the predetermined conditioned place.

Figure 6:
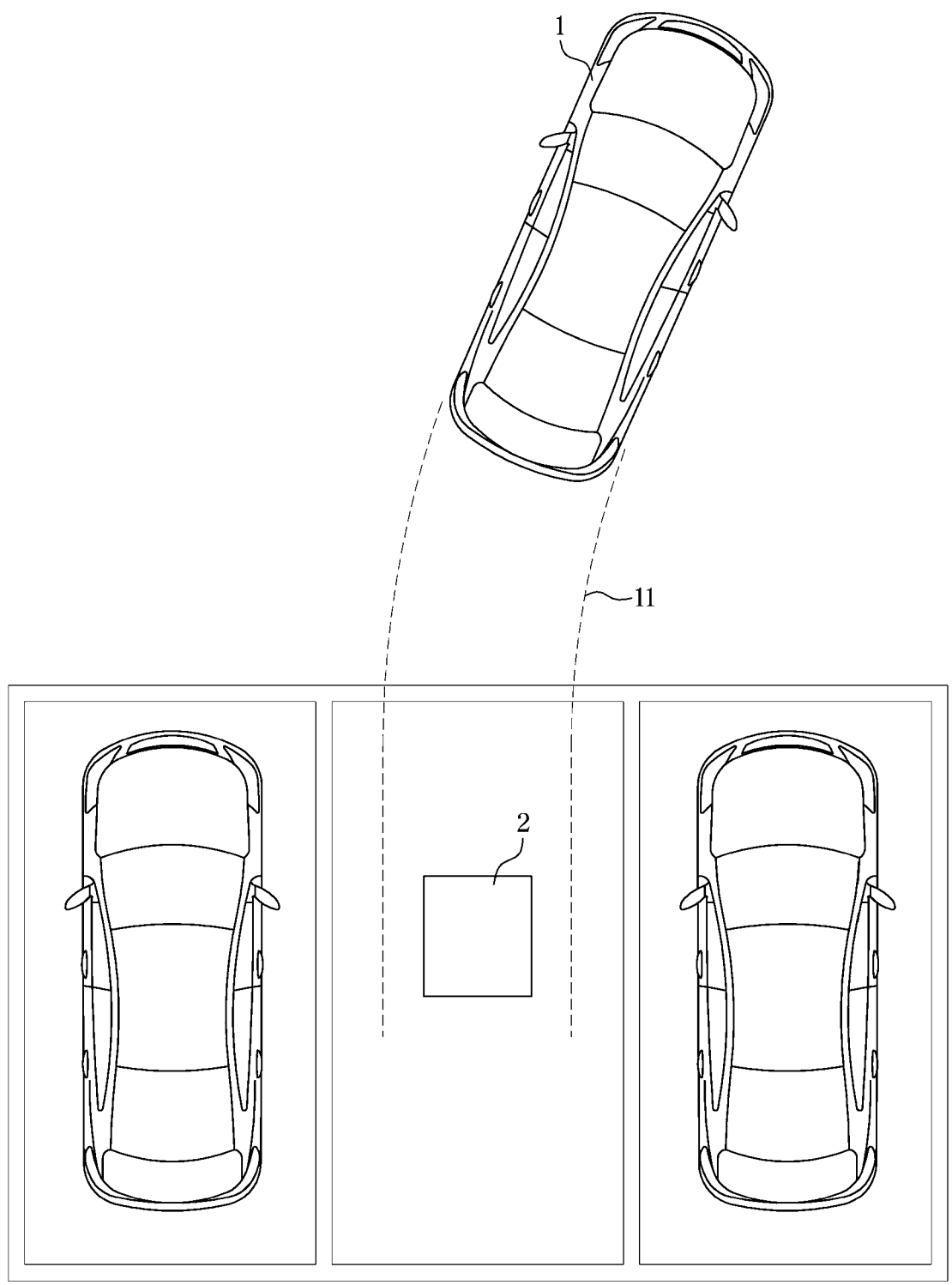
FIG. 6 is a view illustrating a case in which an object is present while the vehicle is being parked according to an embodiment of the disclosure.

FIG. 6 is a view illustrating a case in which the object 2 is present while the vehicle 1 is being parked (or in a reverse driving mode) according to an embodiment of the disclosure. Referring to FIG. 6, the vehicle 1 may further include a gear knob. When it is determined that the vehicle 1 is being parked based on a gear value input by the user through the gear knob, and when the ground clearance is less than the height of the object 2 by comparing the height of the object 2 with the ground clearance, and when it is determined that the vehicle 1 is located on a predicted driving route during reversing, the controller may control the alarm portion to provide the warning alarm to the user. Determining that the vehicle 1 is being parked may be based on a gear value. For example, it may be determined that the vehicle 1 is being parked in various situations, such as a situation in which a speed is slow after a gear value for driving in reverse is input, or a situation in which the vehicle drives in reverse after stopping for a certain period of time. Determining that the vehicle 1 is being parked may be based on a gear value and may be based on the driving information of the vehicle 1. Determining that the vehicle 1 is being parked may be performed using a commonly used method, and is not limited to a simple gear value. When the object 2 is located where the vehicle 1 is to be parked during the vehicle 1 is being parked, the controller may measure the height of the object 2. In this case, when the height of the object 2 is greater than the ground clearance, the vehicle may collide with the object and thus may provide the waring alarm.

Figure 7:
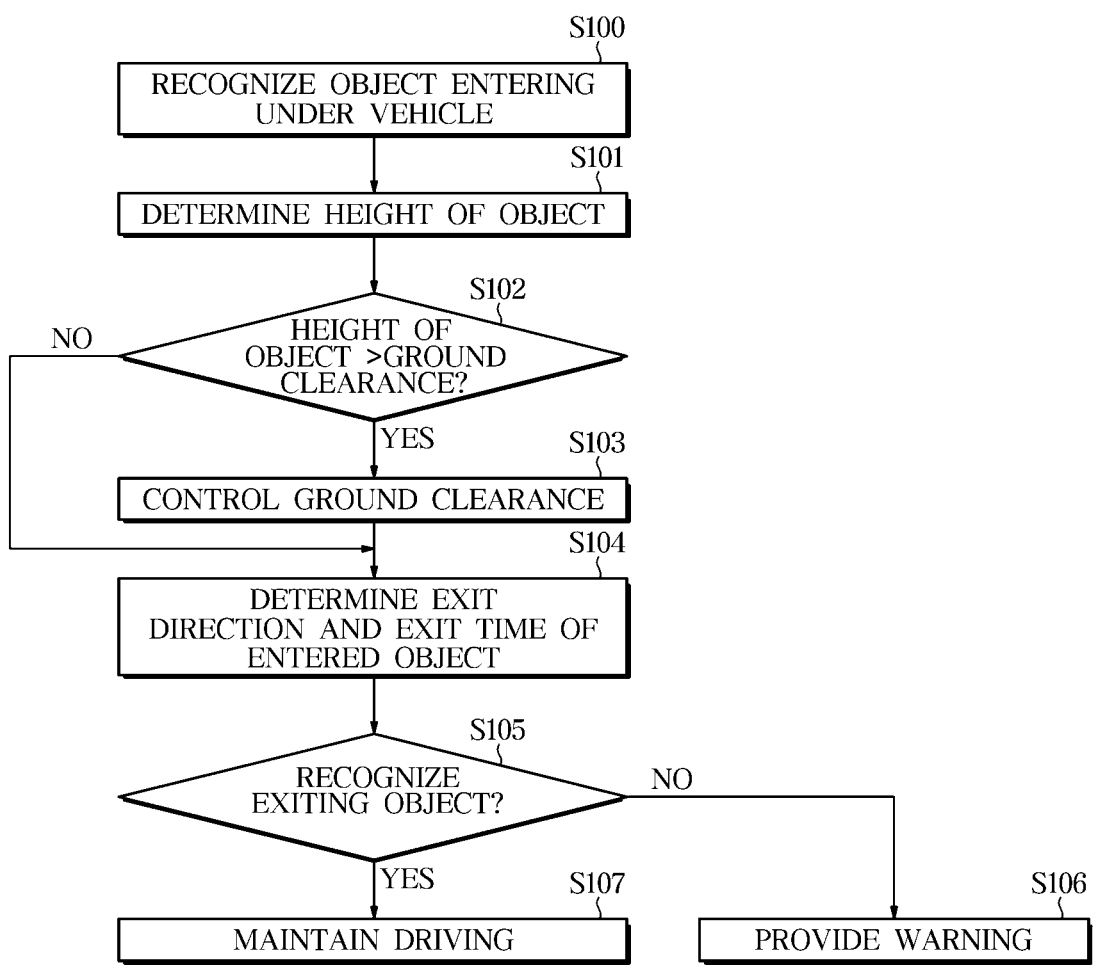
FIG. 7 is a flow diagram illustrating a vehicle control method according to an embodiment of the disclosure.

FIG. 7 is a flow diagram illustrating a vehicle control method according to an embodiment of the disclosure.

Referring to FIG. 7, the controller may recognize the object entering under the vehicle (100) based on the front image obtained by the camera. Thereafter, the controller may determine the height of the object (101), and compare the height of the object with the ground clearance of the vehicle (102). When the height of the object is greater than the ground clearance, the controller may adjust the ground clearance (103) (e.g., by controlling the suspension or an actuator to increase the height of the lower body of the vehicle 1 from the ground) and when the ground clearance is greater than the height of the object, the controller may determine the exit direction and the exit time of the entering object (104). Alternatively, after adjusting the ground clearance (103) because the height of the object is greater than the ground clearance, the controller may determine the exit direction and the exit time of the entered object (104). Thereafter, the controller may recognize whether the exiting object is present (105). When the exiting object is recognized according to the determined exit direction and the determined exit time, the controller may maintain driving of the vehicle (107), and when the exiting object is not recognized according to the determined exit direction and the determined exit time, the controller may determine that the object is caught in the lower portion of the vehicle and provide the warning (106).

As is apparent from the above description, the vehicle and the control method thereof may, when an object is not detected within a predetermined time after being located under the vehicle, determine that the object is caught and may provide an alarm, thereby improving user safety.

Meanwhile, the disclosed embodiments may be embodied in the form of a recording medium storing instructions executable by a computer or a processor. The instructions may be stored in the form of program code and, when executed by a processor (which may be included in the controller), may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an alarm portion;
a storage configured to store information on a ground clearance;
a camera configured to obtain a surrounding image comprising a front image and a rear image of the vehicle;
a sensor configured to obtain driving information comprising speed information of the vehicle; and
a controller configured to:
when an object in front of the vehicle is recognized based on the front image obtained by the camera, determine a height of the object based on the front image obtained by the camera,
when the ground clearance is greater than the height of the object by comparing the height of the object with the ground clearance, and when the object is not recognized in a rear side of the vehicle based on the rear image obtained by the camera, control the alarm portion to output a warning alarm,
obtain location information of the object based on the front image obtained by the camera,
determine a predicted driving route of the vehicle based on the driving information, and
compare the height of the object with the ground clearance, when it is determined that the object is located on the predicted driving route of the vehicle based on the predicted driving route and the location information of the object.

2. The vehicle of claim 1, further comprising:
a driving portion,
wherein, when the height of the object is greater than the ground clearance by comparing the height of the object with the ground clearance, the controller is configured to control the driving portion to increase the ground clearance.

3. The vehicle of claim 1, wherein
the controller is configured to:
when it is determined that the object is located under the vehicle based on the driving information of the vehicle and the location information of the object, calculate an escape time that is a period from a point of time when the object is located under the vehicle to a point of time of recognizing the object based on the rear image obtained by the camera, and
when the object is not recognized within the escape time, control the alarm portion to output the warning alarm.

4. The vehicle of claim 3, wherein
when the object is not recognized within the escape time based on the rear image obtained by the camera, the controller is configured to control the alarm portion to output a guide alarm that recommends moving the vehicle to a predetermined conditioned place.

5. The vehicle of claim 1, wherein
the camera is configured to obtain a side image of the vehicle,
wherein the controller is configured to:
when it is determined that the object is located under the vehicle based on the driving information of the vehicle and the location information of the object, calculate an escape time that is a time taken from a point of time when the object is located under the vehicle to a point of time of recognizing the object based on the side image obtained by the camera, and
when the object is not recognized within the escape time, control the alarm portion to output the warning alarm.

6. The vehicle of claim 3, wherein
when the object is not recognized within the escape time based on the rear image obtained by the camera, the controller is configured to control a driving portion to move the vehicle to the predetermined conditioned place.

7. The vehicle of claim 1, further comprising:
a gear knob,
wherein, when it is determined that the vehicle is being parked based on a gear value input through the gear knob, and when the ground clearance is less than the height of the object by comparing the height of the object with the ground clearance, and when it is determined that the object is located on the predicted driving route, the controller is configured to control the alarm portion to output a warning alarm.

8. A control method of a vehicle comprising:
when an object in front of the vehicle is recognized based on a front image obtained by a camera, determining a height of the object based on the front image obtained by the camera; and
when a ground clearance is greater than the height of the object by comparing the height of the object with the ground clearance, and when the object is not recognized in a rear side of the vehicle based on a rear image obtained by the camera, controlling an alarm portion to output a warning alarm,
wherein the comparison of the height of the object with the ground clearance comprises:
obtaining location information of the object based on the front image obtained by the camera;
determining a predicted driving route based on driving information comprising speed information of the vehicle; and
comparing the height of the object with the ground clearance, when it is determined that the object is located on the predicted driving route of the vehicle based on the predicted driving route and the location information of the object.

9. The control method of claim 8, further comprising:
when the height of the object is greater than the ground clearance by comparing the height of the object with the ground clearance, controlling a driving portion to increase the ground clearance.

10. The control method of claim 8, wherein
the outputting of the warning alarm comprises:
when it is determined that the object is located under the vehicle based on the driving information of the vehicle and the location information of the object, calculating an escape time that is a period from a point of time when the object is located under the vehicle to a point of time of recognizing the object based on the rear image obtained by the camera; and
when the object is not recognized within the escape time, outputting the warning alarm.

11. The control method of claim 10, wherein
the outputting of the warning alarm comprises:
when the object is not recognized within the escape time based on the rear image obtained by the camera, outputting a guide alarm that recommends moving the vehicle to a predetermined conditioned place.

12. The control method of claim 10, further comprising:
when the object is not recognized within the escape time based on the rear image obtained by the camera, controlling a driving portion to move the vehicle to the predetermined conditioned place.

13. The control method of claim 8, wherein
the outputting of the warning alarm comprises:
when it is determined that the object is located under the vehicle based on the driving information of the vehicle and the location information of the object, calculating an escape time that is a time taken from a point of time when the object is located under the vehicle to a point of time of recognizing the object based on a side image obtained by the camera, and when the object is not recognized within the escape time, outputting the warning alarm.

14. The control method of claim 8, wherein
the outputting of the warning alarm comprises:
when it is determined that the vehicle is being parked based on a gear value input through a gear knob, and when the ground clearance is less than the height of the object by comparing the height of the object with the ground clearance, and when it is determined that the object is located on the predicted driving route, outputting the warning alarm.

* * * * *